(12) United States Patent
Wada

(10) Patent No.: US 7,248,722 B2
(45) Date of Patent: Jul. 24, 2007

(54) FINGERPRINT IDENTIFICATION APPARATUS AND FINGERPRINT IDENTIFICATION METHOD

(75) Inventor: Takuya Wada, Kanagawa (JP)

(73) Assignee: Sony Corporation, Tokyo (JP)

( * ) Notice: Subject to any disclaimer, the term of this patent is extended or adjusted under 35 U.S.C. 154(b) by 602 days.

(21) Appl. No.: 10/158,515

(22) Filed: May 30, 2002

(65) Prior Publication Data

US 2003/0002720 A1  Jan. 2, 2003

(30) Foreign Application Priority Data

May 31, 2001 (JP) ............... 2001-164409

(51) Int. Cl.
*G06K 9/00* (2006.01)
(52) U.S. Cl. .............. 382/124; 382/125; 340/5.53; 340/5.83
(58) Field of Classification Search ............ 382/115, 382/116, 124, 125–127, 209, 291, 190; 283/68–69; 340/5.53, 5.83; 713/186; 902/3; 427/1
See application file for complete search history.

(56) References Cited

U.S. PATENT DOCUMENTS 5,982,913 A * 11/1999 Brumbley et al. .......... 382/124
6,075,876 A * 6/2000 Draganoff .................. 382/124
6,134,340 A * 10/2000 Hsu et al. .................. 382/124
6,241,288 B1 * 6/2001 Bergenek et al. ............ 283/67

* cited by examiner

*Primary Examiner*—Bhavesh M Mehta
*Assistant Examiner*—John Strege
(74) *Attorney, Agent, or Firm*—Finnegan, Henderson, Farabow, Garrett & Dunner, L.L.P.

(57) ABSTRACT

By employing template matching using a collation image which is obtained by using a proper technique to binarize an input digital image for fingerprint identification, and a plurality of templates which are recorded beforehand, a fingerprint identification apparatus and method determine whether identity is established between the collation image and each of the recorded images from which recorded templates are extracted. Instead of checking positional relationships among all addresses having high degrees of matching detected for each template, positional relationship checking is performed between addresses detected about adjacent templates. This can greatly reduce the number of combinations for matching, and enables rapid processing. The fingerprint identification apparatus and method are resistant to a change in finger shape since they perform processing for physically close templates, compared with the case of performing processing for separate templates.

20 Claims, 7 Drawing Sheets

16-BIT LENGTH

16-BIT LENGTH

| 0 | 1 | 2 | 3 |
| 4 | 5 | 6 | 7 |
| 8 | 9 | 10 | 11 |
| 12 | 13 | 14 | 15 |

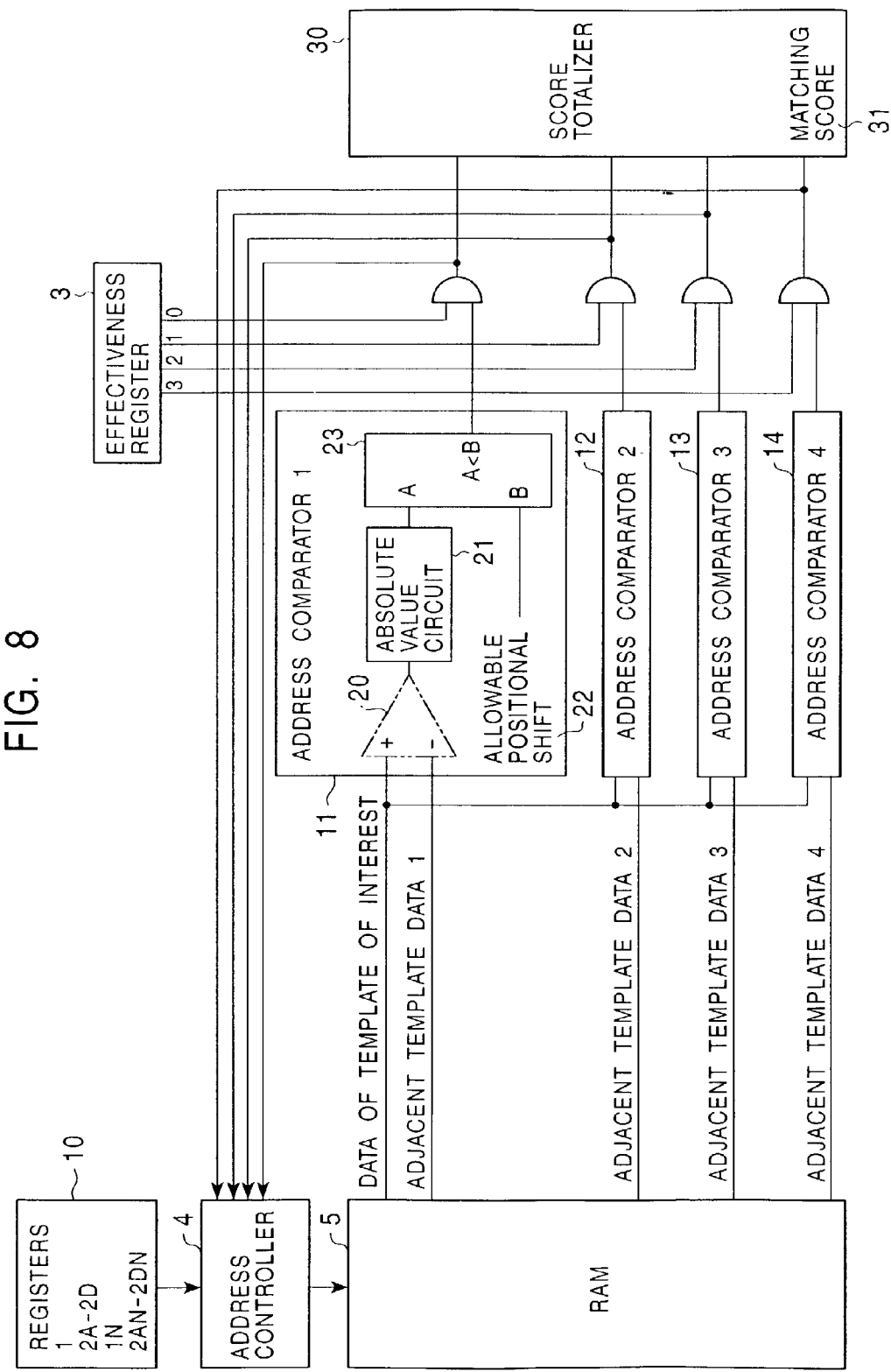

FINGERPRINT IDENTIFICATION APPARATUS AND FINGERPRINT IDENTIFICATION METHOD

BACKGROUND OF THE INVENTION

1. Field of the Invention

The present invention relates to a fingerprint identification apparatus and method that use templates to identify a read fingerprint image.

2. Description of the Related Art

Conventionally, a technique is known as a fingerprint-image identification method. The technique extracts, from recorded fingerprint images, a plurality of partial images (templates) sufficiently representing the fingerprints, performs matching of the templates with an image read for checking, and determines, based on positional relationships of highly matched points detected in each of the templates, whether or not the read image matches each of the recorded fingerprint images.

In the above technique of the related art, when a large number of templates are used, and a large number of highly matched points are detected, the number of combinations of the templates and the points greatly increases, thus causing a problem in that the processing requires a lot of time.

For example, when ten templates are used, and thirty highly matched points are detected for each of the templates, the total number of combinations is thirty to the tenth power, that is, approximately six million million.

In addition, when templates are broadly distributed in an image, and a change in finger shape is large, a problem occurs in that fingerprint identification performance greatly deteriorates.

SUMMARY OF THE INVENTION

Accordingly, it is an object of the present invention to provide a fingerprint identification apparatus and method which greatly reduce the time required for fingerprint identification using templates and which maintains identification performance against a change in finger shape.

To this end, according to an aspect of the present invention, a fingerprint identification apparatus is provided which includes a collation unit for collating a piece of template information extracted from fingerprint information which is recorded beforehand with a part of collation fingerprint information which is input for collation, an extraction unit for extracting, in accordance with the degree of matching detected by the collation unit, collation positions in the collation fingerprint information in which the piece of template information is collated with the part of collation fingerprint information, and a determination unit for determining whether or not identity is established between the recorded fingerprint information and the collation fingerprint information based on the collation positions extracted by the extraction unit and on template extraction positions in the recorded fingerprint information in which the piece of template information is extracted from the recorded fingerprint information.

Preferably, the determination unit determines whether or not the identity is established between the recorded fingerprint information and the collation fingerprint information by comparing only the relationship of the collation positions with the relationship of the template extraction positions.

The determination unit may determine whether or not the identity is established between the recorded fingerprint information and the collation fingerprint information by comparing only the relationship of the collation positions collated by the collation unit with the template extraction positions which are mutually near.

The determination unit may determine whether or not the identity is established between the recorded fingerprint information and the collation fingerprint information by comparing only the relationship of the collation positions collated by the collation unit with the relationship of the template extraction positions which are mutually adjacent.

The extraction unit may extract a predetermined number of collation positions which have high degrees of matching detected by the collation unit.

The extraction unit may extract, based on a predetermined threshold value, the collation positions which have the highest degree of matching detected by the collation unit.

The template information may be image information.

The template information may be one-dimensional image information.

The piece of template information may be of one of clusters of image information which are obtained by dividing image information represented by the recorded fingerprint information.

According to another aspect of the present invention, a fingerprint identification method is provided which includes the steps of collating a piece of template information extracted from fingerprint information which is recorded beforehand with a part of collation fingerprint information which is input for collation, extracting, in accordance with the degree of matching detected in the collating step, collation positions in the collation fingerprint information in which the piece of template information is collated with the part of collation fingerprint information, and determining whether or not identity is established between the recorded fingerprint information and the collation fingerprint information based on the collation positions extracted in the extracting step and on template extraction positions in the recorded fingerprint information in which the piece of template information is extracted from the recorded fingerprint information.

According to another aspect of the present invention, a computer-readable recording medium containing a program is provided. The program controls a computer to execute the steps of collating a piece of template information extracted from fingerprint information which is recorded beforehand with a part of collation fingerprint information which is input for collation, extracting, in accordance with the degree of matching detected in the collating step, collation positions in the collation fingerprint information in which the piece of template information is collated with the part of collation fingerprint information, and determining whether or not identity is established between the recorded fingerprint information and the collation fingerprint information based on the collation positions extracted in the extracting step and on template extraction positions in the recorded fingerprint information in which the piece of template information is extracted from the recorded fingerprint information.

According to another aspect of the present invention, a program for controlling a computer is provided. The program controls the computer to execute the steps of collating a piece of template information extracted from fingerprint information which is recorded beforehand with a part of collation fingerprint information which is input for collation, extracting, in accordance with the degree of matching detected in the collating step, collation positions in the collation fingerprint information in which the piece of template information is collated with the part of collation fingerprint information, and determining whether or not identity is established between the recorded fingerprint information and the collation fingerprint information based on the collation positions extracted in the extracting step and on template extraction positions in the recorded fingerprint information in which the piece of template information is extracted from the recorded fingerprint information.

According to the present invention, the time required for checking positional relationships of templates can be greatly reduced compared with the case of determining fingerprint identity by checking positional relationships of positions having high degrees of matching among all the templates.

In addition, by determining fingerprint identity based on the results of particularly checking positional relationships of points having high degrees of matching between physically close templates, fingerprint identification can be prevented from being affected by a change in fingerprint image, so that fingerprint identification that is resistant to a change in finger shape is realized.

BRIEF DESCRIPTION OF THE DRAWINGS

FIG. 8 is a block diagram showing the address processor of the fingerprint registering/verifying circuit shown in FIG. 7.

DESCRIPTION OF THE PREFERRED EMBODIMENTS

An embodiment of the present invention is described below with reference to the accompanying drawings.

The following embodiment is a preferred embodiment of the present invention and has various types of technically preferable limitations. However, the scope of the present invention is not limited to the embodiment unless limitation on the present invention is particularly not described in the following description.

A recording unit 2 is described below with reference to FIGS. 1 and 2.

Figure 1:
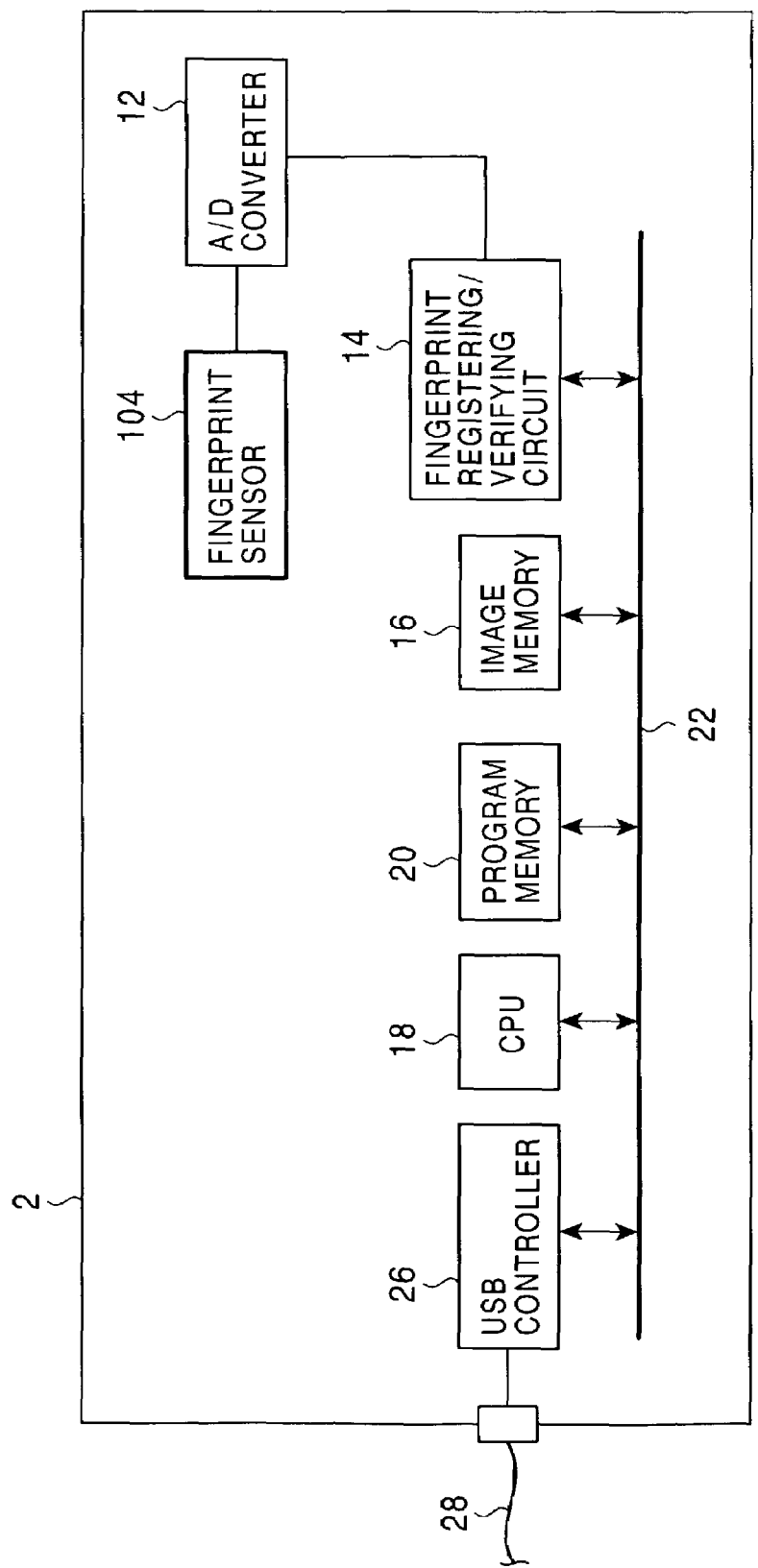
FIG. 1 is a block diagram showing an example of the recording unit 2.

FIG. 1 is a block diagram showing an example of the recording unit 2. FIG. 2 shows a system configuration including the recording unit 2 shown in FIG. 1.

Figure 2:
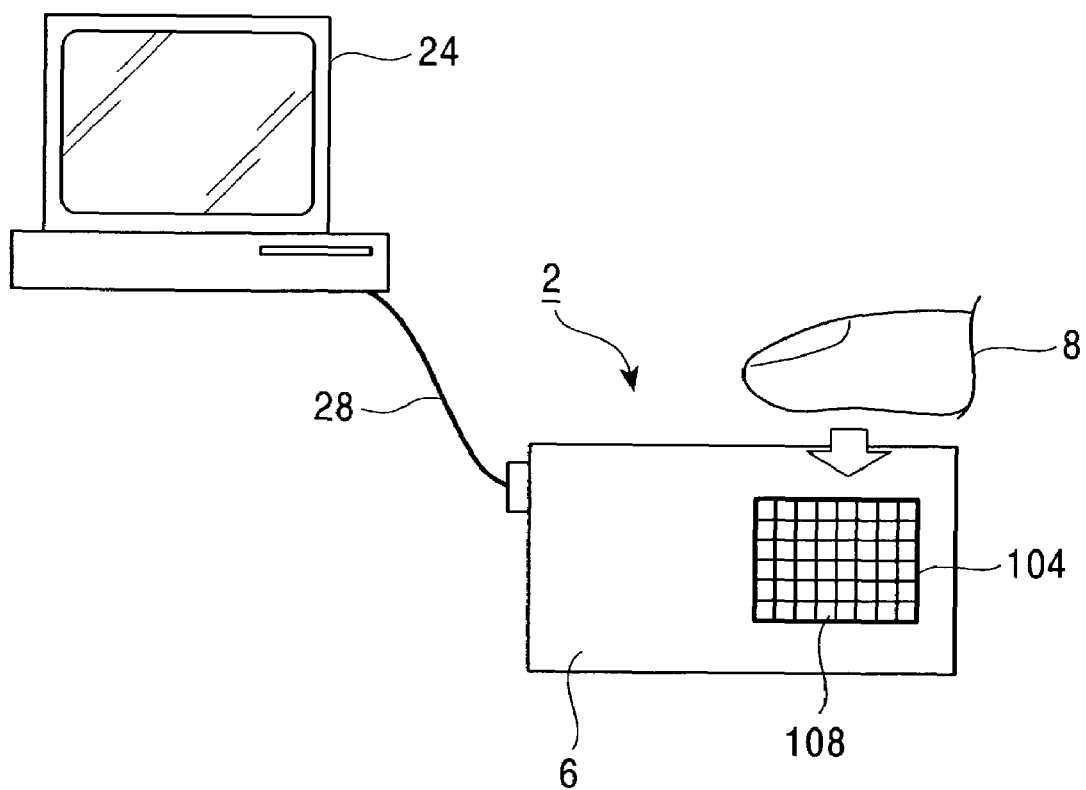
FIG. 2 is an illustration of a system configuration including the recording unit 2 shown in FIG. 1.

As FIG. 2 shows, the recording unit 2 has a fingerprint sensor unit 104 on a surface of a housing 6. The fingerprint sensor unit 104 includes capacitive sensors that output electric signals representing a gray scale image by detecting a difference of capacitance caused by ridges and valleys on the fingerprint of a finger 8 when it touches a fingerprint reading part 108.

Figure 3:
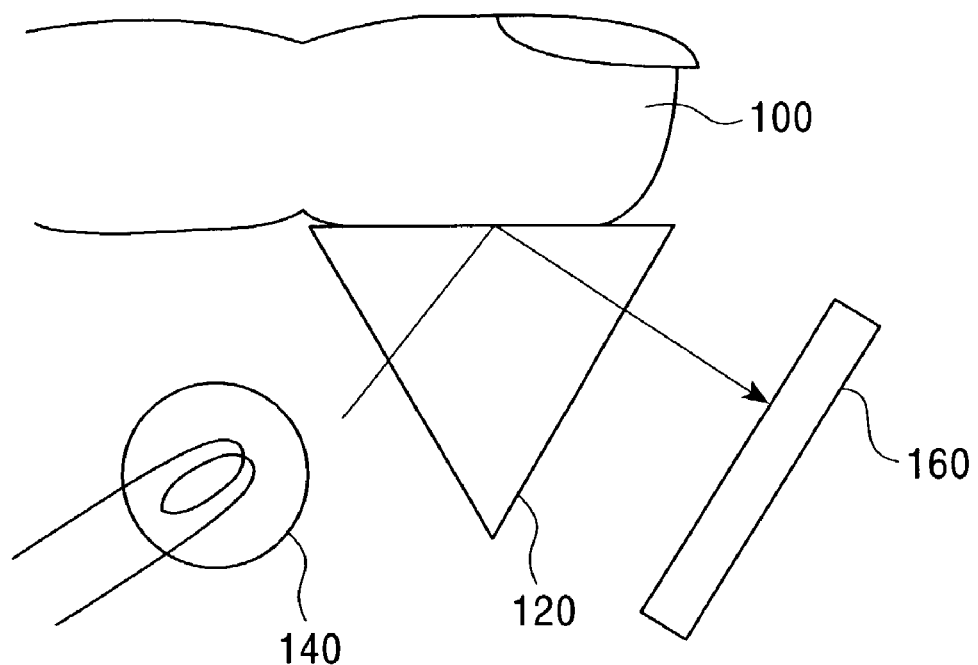
FIG. 3 is a sectional view showing the fingerprint sensor unit 104 shown in FIG. 2.

When, for example, optical sensors are used, the fingerprint sensor unit 104 includes parts shown in FIG. 3, that is, a triangular prism 120 having a touch surface for a finger 100, a light source 140 for emitting a lighting ray to the triangular prism 120, and a charge-coupled device (CCD) camera 160.

An example the structure shown in FIG. 3 has been commonly used. The fingerprint sensor unit 104 for use in the present invention may have a structure based on any method if it can capture ridges on fingerprint at a resolution that is not less than a predetermined value, and is particularly not limited to the structure in FIG. 3.

As FIG. 1 shows, for recording, the recording unit 2 includes an analog-to-digital (A/D) converter 12, a fingerprint registering/verifying circuit 14, an image memory 16, a central processing unit (CPU) 18, and a program memory 20.

The A/D converter 12 outputs image data representing a fingerprint-gray-scale image by digitizing a fingerprint image signal output by the fingerprint sensor unit 104.

The fingerprint registering/verifying circuit 14 is formed by, for example, a large-scale integrated circuit (LSI). Based on the image data from the A/D converter 12, it generates binarized image data representing a binarized image of fingerprint, and stores the binarized image data in the image memory 16 as a rewritable nonvolatile memory.

The program memory 20 includes a random access memory (RAM) and a read-only memory (ROM). The CPU 18 uses a bus line 22 to acquire program data stored in the ROM, and operates based on the program data while using the RAM, whereby the entirety of the recording unit 2 is controlled.

A Universal Serial Bus (USB) controller 26 functions as an interface for connecting the recording unit 2 by a USB cable 28 to an electronic unit (such as the computer 24 shown in FIG. 2) that requires authentication based on fingerprint identification. The electronic unit is arbitrary one of an information appliance, a portable information terminal, and a security system terminal such as an entering/leaving controller. An interface therefor may be based on RS-232C.

The CPU 18 outputs image data of fingerprints stored in the image memory 16 to the computer 24 via the bus line 22, the USB controller 26, and the USB cable 28.

The operation of the fingerprint sensor unit 104 and a fingerprint image read thereby are described below.

When the fingerprint sensor unit 104 employs a capacitance method, by applying voltages to elements constituting the sensors while they are being touched by the finger 100, and measuring stored electric charges so that a capacitance representing ridges on the finger 100 can be found, a fingerprint image is read and an electric signal representing the shading of the fingerprint is output. When the fingerprint sensor unit 104 employs an optical method, light from the light source 140 is diffusely reflected by the protrusions of the fingerprint of the finger 100 and is totally reflected by the troughs of the fingerprint of the finger 100. Accordingly, by focusing the reflected light on the CCD camera 160, a fingerprint image in which the protrusions look dark and the troughs look bright can be obtained. The fingerprint image is sampled at appropriate predetermined temporal intervals, for example, it is converted into a digital image having a size of 256 by 218 pixels. By appropriately digitizing the digital image, conversion into a binary pixel image in which each pixel has zero or one can be obtained.

Methods for the digitization include level comparison of the average of the pixel levels of the entire image with each level, and comparison of the average of pixel levels in an appropriate range around a pixel of interest with each pixel level.

Figure 4:
FIG. 4 is an illustration of a specific example of a fingerprint image read by the fingerprint sensor unit 104 shown in FIGS. 2 and 3.

FIG. 4 illustrates a specific example of the obtained binary pixel image. The black portions of the image indicate the protrusions of the fingerprint, and the white portions of the image indicate the troughs of the fingerprint.

In the fingerprint identification system shown in FIG. 2, a plurality of patterns composed of two-dimensional image information extracted from appropriate portions of the binary image are recorded as recorded templates beforehand in a nonvolatile memory such as an electrically erasable, programmable read-only memory (EEPROM) or a flash ROM. Normally, patterns that are extracted from portions representing the characteristics of the fingerprint, such as whorls of whorl fingerprints, are recorded as recorded templates.

Figures 5, 6:
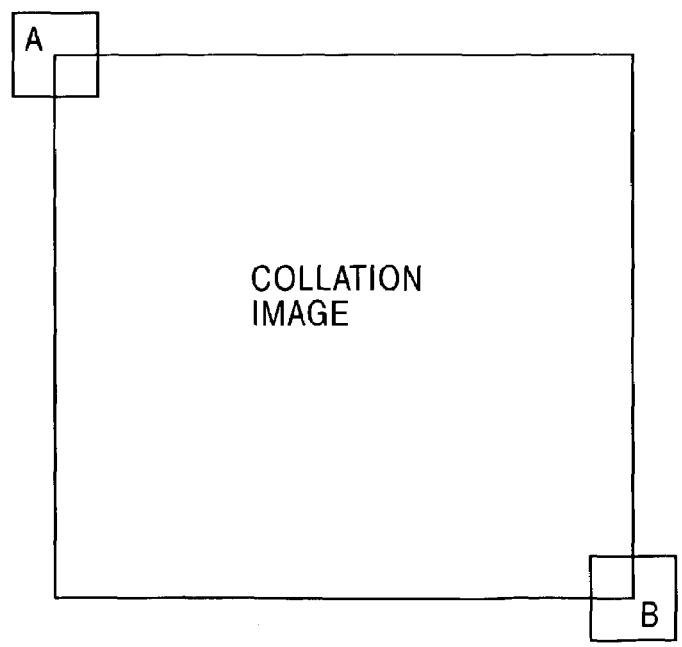
FIG. 5 is an illustration of an example of a template structure for use in fingerprint identification.
FIG. 6 is an illustration of processing that determines the degree of matching of a collation image (collation image) with the template shown in FIG. 5.

In the following, as FIG. 5 shows, a case in which 64-bit two-dimensional templates composed of four 16-bit-length line segments at intervals of four pixels are used as recorded templates is described below.

Sixteen templates are arranged so that one template is horizontally and vertically sixteen pixels away from an adjacent template. Thus, the storage capacity of the sixteen templates is 128 bytes.

When fingerprint identification is performed, the fingerprint registering/verifying circuit 14 generates binary image data representing a binary image of a fingerprint, based on the image data from the A/D converter 12. By using pattern matching to compare the generated binary image with the binary image data of a fingerprint which is stored in the image memory 16 beforehand, the fingerprint registering/verifying circuit 14 determines whether the generated image data matches the stored image data.

The CPU 18 combines with the USB controller 26 to constitute a data input means, and controls the image memory 16 to retain binary image data input from the USB cable 28.

For details, when the fingerprint identification is performed, a change in the average of all the pixel levels is used to detect a touch of the finger 100 on the prism 120. An image obtained at the moment is binarized similarly to the method of obtaining the recorded templates, and is written in the binary image area of a work RAM or the like.

Next, in order to detect the coordinates of points having high similarities (degrees of matching) based on pattern matching between each recorded template and a collation image, the degrees of matching at all the points of the collation image are calculated. The degrees of matching are calculated, while the template is being shifted every one pixel.

After the coordinates of points having high degrees of matching are detected for each template, in order that calculation for checking the positional relationship of the coordinates may be simplified, a distance (address difference) between each template of interest and a template used as a reference for address normalization must be written in an offset address register before the calculation of the degrees of matching is initiated.

In other words, when sixteen templates 0 to 15 are arranged as shown in FIG. 5, and template 10 is used as a reference template, the address difference of template 0 is 32 both in the horizontal and vertical directions. Thus, the offset address register (horizontal value, vertical value)=(32, 32).

Similarly, for template 1, the offset address register=(16, 32).

Next, processing for template 0 is performed. This is that, after setting (32, 32) in the offset address register, the degrees of matching at all the pixel positions of the collation image are calculated.

By way of example, when the template 0 is disposed so that its center is positioned at the origin of the collation image as shown in the frame A in FIG. 6, the number of zeroes is counted in the 64-bit pattern which is generated by performing the exclusive logical sum of the 64-bit pattern of the registered template 0 and the corresponding 64-bit pattern of the collation image in order to calculate how many bits of the two patterns match (the degree of matching).

At this time, each portion in which the template does not overlap with the collation image is excluded in the calculation of the degree of matching.

Next, the template is shifted by one bit in the horizontal right, and similar calculation is performed. This operation is repeatedly performed until the center of the template reaches the bottom right end of the collation image (the frame B shown in FIG. 6).

When the calculated degree of matching is greater than a predetermined value (threshold value), the values of the offset address register are added to the coordinates of the center of the template in each of the horizontal and vertical directions. The obtained values are written in an area in the address area of a work RAM or the like.

After calculating the degrees of matching of the entire image, without fixing the threshold value beforehand, an appropriate number of pairs of coordinates having higher degrees of matching may be selected.

Also, as the threshold value is greater, stricter matching is required. Thus, even for a slight change in image, it is not determined that the template matches the collation image.

Accordingly, when an image irregularity due to a change in the finger shape is expected as in a fingerprint image, a value that is approximately 70% to 80% of the degree of matching is appropriate for the threshold value.

After the above processing for template 0 ends, processing for each of the other templates is performed which performs setting of appropriate values in the offset address register, detection of points having high degrees of matching, correction of the coordinates, and the corrected values in an area for each of the other templates in the work RAM.

Next, between groups of coordinates detected for adjacent templates, it is determined whether relative positional relationships similar to the templates exist.

This embodiment assumes a case in which each set of thirty pairs of coordinates having higher degrees of matching are selected for each template. In general, just thirty points are not always selected, but it is assumed, for brevity of description, that just thirty points are selected.

In this case, pairs of coordinates of template number N (N=0 to 15) are represented by A(N, 0) to A(N, 29). For example, pairs of coordinates of template 5 are represented by A(5, 0) to A(5, 29).

As is clear from FIG. 5, templates that are horizontally and vertically adjacent to template 0 are templates 1 and 4, respectively. Accordingly, coordinate comparison is performed for all the combinations of the pairs of coordinates of both templates.

First, between each of pairs A of coordinates A(0, k) (k=0 to 29) of template 0, and each of pairs A of coordinates A(1, m) (m=0 to 29), address comparison is performed.

Figure 7:
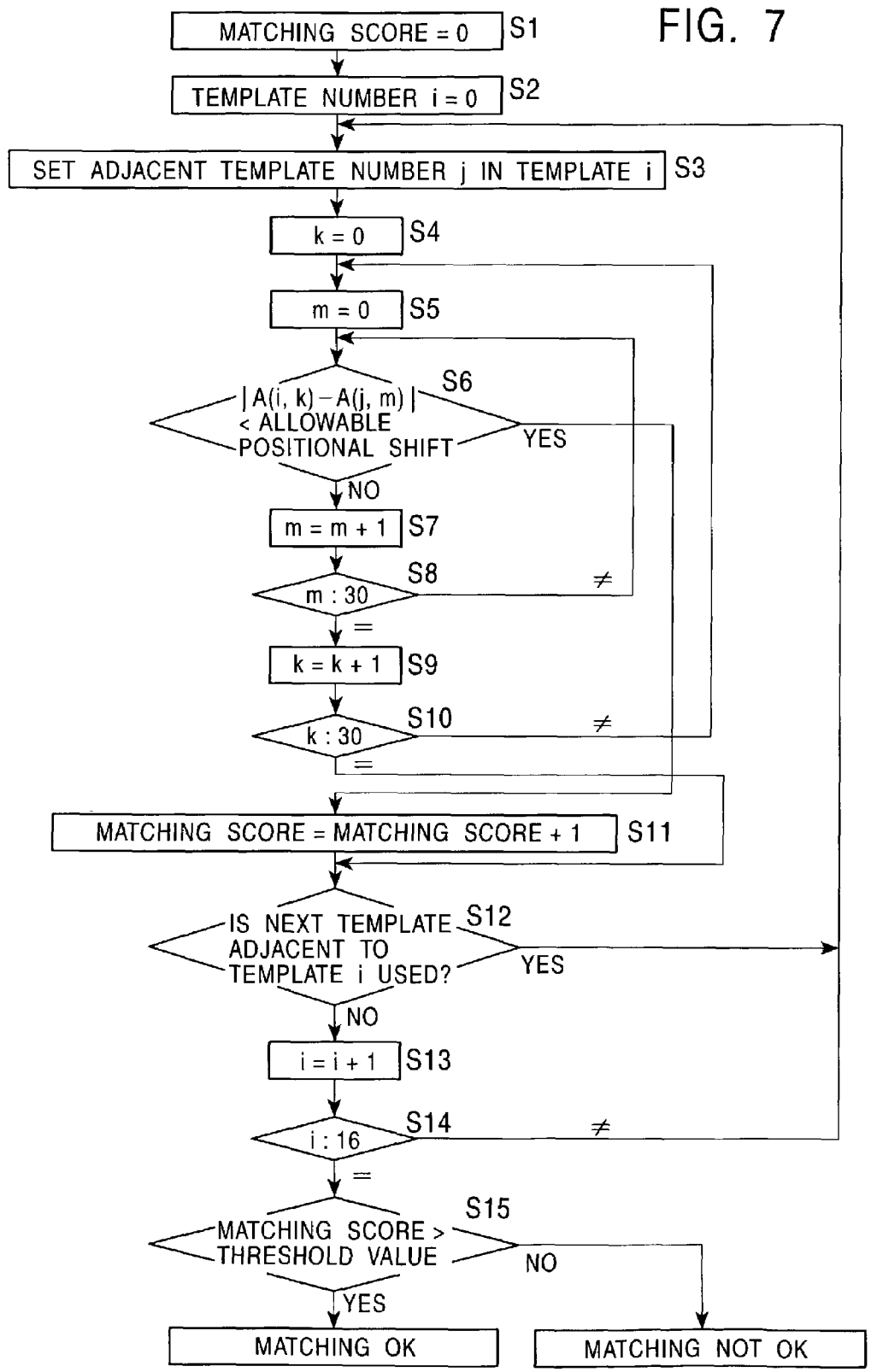
FIG. 7 is a flowchart showing an address comparing operation of a fingerprint registering/verifying circuit according to the present invention.

FIG. 7 is a flowchart showing an operation for performing the address comparison.

After A(0, 0) is loaded into register 1, while each of A(1, 0) to A(1, 29) is being sequentially loaded into register 2, address comparison therebetween is performed.

In the address comparison, it is determined whether the absolute values of the address differences in the horizontal and vertical directions of A(0, 0) and A(1, m) (m=0 to 29) are less than a predetermined allowable positional shift.

When the results of determinations for all the values of "m" are negative (the condition is not satisfied), similar address comparison between A(0, 1) and each of A(1, m) (m=0 to 29) is performed (in steps S1 to S10).

Until address comparison for all the combinations of (k, m) ends, if the condition is satisfied in any of the combinations (in step S10), a matching score having reset to an initial value of zero is set to 1 (in step S11), and the operation proceeds to processing for templates 1 and 4 (in step S12).

If the results of determinations for all the combinations of (k, m) are negative, the matching score is unchanged as zero.

In the processing for templates 0 and 4, it is determined whether the address comparison condition between each of A(0, k) and each of A(4, m) in any one of the combinations of (k, m) is satisfied. At the time it is affirmatively determined, the matching score is incremented by one, and the operation proceeds to processing for template 1 (in step S13).

Since templates that are adjacent to template 1 are templates 0, 2, and 6, processing similar to that for template 0 is performed between templates 1 and 2, and between templates 1 and 6. This is because processing for templates 1 and 0 has already ended.

When the matching score at the time processing for up to template 15 ends is greater than a predetermined threshold value, it is determined that matching is OK, while when it is less than the threshold value, it is determined that matching is not OK (in steps S14 and S15).

The full matching score in the case of the template arrangement shown in FIG. 5 is 24. Although, in the above embodiment, positional relationship checking is performed between horizontally and vertically adjacent templates, additional processing for obliquely adjacent templates can be performed.

As described above, instead of checking positional relationships among all addresses detected for each template, by checking positional relationship between addresses detected for adjacent templates, the number of combinations is greatly reduced.

Also, since the processing is performed only for physically close templates, it is possible to strongly cope with a change in finger shape, compared with processing between distant templates.

Next, a circuit configuration for effectively performing the above address comparison processing is described below.

FIG. 8 is a block diagram showing the address processor of the fingerprint registering/verifying circuit 14.

The address processor includes a group 10 of registers, an effectiveness register 3 for managing the number of adjacent templates, an address controller 4 for controlling addresses, a RAM 5 for storing the addresses, four address comparators 1 to 4 (11 to 14), and a score totalizer 30 for incrementing the matching score.

The group 10 of registers includes the following ones. In register 1, the template number of a template of interest is written. In registers 2A to 2D, the template numbers of the templates that are adjacent to the template whose template number is written in the register 1.

Pieces of data in the address area that correspond to the templates designated by the registers 1 and 2A to 2D are sequentially read during the processing.

The effectiveness register 3 is a 4-bit register that indicates which of the registers 2A to 2D is effective ("effective" indicated by "1", "not effective" indicated by "0") in order to cope with a case in which the number of adjacent templates is less than four.

In general, when an appropriate number of addresses having higher degrees of matching are selected, the number of addresses is not just "N". Accordingly, in a number-of-addresses register 1N, the number of addresses detected for a template of interest is written, and in registers 2AN, 2BN, and 2DN, the number of addresses detected for templates adjacent to the template of interest is written.

Although the group 10 of registers includes registers for storing various types of data for arithmetic processing, they are not shown in FIG. 8.

The address comparators 1 to 4 (11 to 14) are identical in structure and each include a computing unit 20 that computes the difference between the data of the template of interest and the data of a template adjacent thereto, an absolute value circuit 21 that finds the absolute value of the computed difference, and a comparator 23 that compares the absolute value and an allowable positional shift.

The outputs of the address comparators 1 to 4 (11 to 14) and the register values of the effectiveness register 3 are logically multiplied by AND gates, and the AND values are supplied to the score totalizer 30.

In this construction, when processing for template 0 is initially performed, "0" is set in register 1, and the template numbers 1 and 4 of the templates adjacent to template 0 are set in registers 2A and 2B, respectively. Since the number of templates adjacent to template 0 is only two, only the lower two bits of the effectiveness register 3 are set to 1's.

When the processing is started after setting the above values, the first data of the templates 0 is set in register A (not shown), and the first data of template 1 and the first data of template 4 are subsequently loaded into registers B and C (not shown), respectively.

Each of registers A and B performs checking about whether the absolute value of a difference in each of the horizontal and vertical addresses is less than an allowable positional shift. Simultaneously, each of registers A and C performs similar checking.

If the result of the checking is negative, subsequent data is set in each of registers B and C, and a similar process is performed.

When the above processing is performed, at the time the number of pieces of data read from address areas for templates 1 and 4 is equal to the value of register 2AN or 2BN, the second data of template 0 is set in register A, and the above processing is repeatedly performed.

When the result of the checking is affirmative in any point of the processing for templates 0 and 1, or templates 0 and 4, the processing for two templates at the time the checking is affirmative is terminated, and the matching score 31 at the above time in the score totalizer 30 is incremented by one. For example, when the checking is affirmative between templates 0 and 1, and the checking is affirmative between templates 0 and 4, the matching score 31 is 2.

By performing the above processing while sequentially changing the template number of the template of interest from 0 to 15, the final value of the matching score 31 is found.

In the above processing, the address controller 4 controls accessing of the address areas, based on the contents of registers 1, 2A to 2D, 1N, and 2AN to 2AD and the results of address comparison.

In addition to vertical and horizontal directions, when the processing is performed between obliquely adjacent templates, the number of related registers and address comparators is set at eight.

By employing the above circuit configuration, an address comparing circuit which has reduced gate size and can operate at very high speed is realized.

In the above embodiment, the positional relationships of positions having high degrees of matching about a plurality of templates in image identification using template matching are checked. However, the positional relationships and combination of not only adjacent templates but also of templates with one template provided therebetween or arbitrary templates may be checked. When determining whether or not images match each other, not by checking all templates but by checking only the positional relationships of positions having high degrees of matching between adjacent templates, the time required for positional checking can be greatly reduced, and fingerprint identification that is resistant to a change in fingerprint image is realized.

In the above embodiment, a matching score is influenced by whether or not an address difference between templates having high degrees of matching is less than a predetermined allowable value. In addition, the matching score may be controlled to reflect an address difference between templates and the degree of matching of each template.

In the above embodiment, each template is divided into rectangles, but the shape is not limited thereto. The template may be divided into arbitrarily closed curve shapes such as polygons, circles, ellipses, and sector forms. The template may have overlapping portions and a plurality of divided areas.

Also, in the above embodiment, each template composed of two-dimensional image information is used. However, each template composed of one-dimensional information may be used.

Although the above embodiment performs processing in dedicated collating units, a general-purpose computer may be used to perform recording, collation, authentication, etc. In this case, by using a means such as an apparatus which is connected by an interface such as the USB or RS232C and which includes a fingerprint reading-sensor unit, a server or another apparatus on a network, various recording media, or an input means, fingerprint information is input. A program concerning recording, collation, authentication, etc., may be provided in the form of various recording media such as a compact-disk read-only memory, a digital versatile disk, and a floppy disk, and may be provided by a network.

What is claimed is:

1. A fingerprint identification apparatus comprising:
   collation means for collating positions in prerecorded fingerprint templates with positions in collation fingerprint information, wherein the collation fingerprint information is input for comparison with the templates;
   calculating means for calculating the degree of matching between data in the templates and data in the collation fingerprint information;
   extraction means for extracting collation positions based on the calculated degree of matching at each position within the collation fingerprint information, the collation positions indicating the position of the prerecorded fingerprint templates relative to the collation fingerprint information;
   address distance calculating means for calculating address differences between the prerecorded fingerprint templates and a reference template;
   generation means for generating corrected coordinates by adding the address differences to the collation positions; and
   determination means for determining whether or not identity is established between one or more of the prerecorded fingerprint templates and the collation fingerprint information by calculating the number of prerecorded fingerprint templates for which the corrected coordinates differ by less than an allowable positional shift.

2. The fingerprint identification apparatus according to claim 1, wherein said determination means determines whether or not identity is established between the prerecorded fingerprint templates and the collation fingerprint information based only on the number of prerecorded fingerprint templates for which the corrected coordinates differ by less than the allowable positional shift.

3. The fingerprint identification apparatus according to claim 1, wherein at least two prerecorded fingerprint templates that are distant from one another are excluded from the calculation of the number of prerecorded fingerprint templates for which the corrected coordinates differ by less than the allowable positional shift.

4. The fingerprint identification apparatus according to claim 1, wherein at least two nonadjacent prerecorded fingerprint templates are excluded from the calculation of the number of prerecorded fingerprint templates for which the corrected coordinates differ by less than the allowable positional shift.

5. The fingerprint identification apparatus according to claim 1, wherein said extraction means extracts a predetermined number of collation positions which have high degrees of matching.

6. The fingerprint identification apparatus according to claim 1, wherein said extraction means extracts, based on a predetermined threshold value, the collation positions which have the highest degree of matching.

7. The fingerprint identification apparatus according to claim 1, wherein the templates are images.

8. The fingerprint identification apparatus according to claim 1, wherein the templates are images stored in one dimension.

9. The fingerprint identification apparatus according to claim 8, wherein the templates are obtained by dividing images of recorded fingerprints.

10. A fingerprint identification method comprising the steps of:
    collating positions in prerecorded fingerprint templates with positions in collation fingerprint information, wherein the collation fingerprint information is input for comparison with the templates,
    calculating the degree of matching between data in the templates and data in the collation fingerprint information;
    extracting collation positions based on the calculated degree of matching at each position within the collation fingerprint information, the collation positions indicating the position of the prerecorded fingerprint templates relative to the collation fingerprint information;
    calculating address differences between the prerecorded fingerprint templates and a reference template;
    generating corrected coordinates by adding the address differences to the collation positions; and
    determining whether or not identity is established between one or more of the prerecorded fingerprint templates and the collation fingerprint information by calculating the number of prerecorded fingerprint templates for which the corrected coordinates differ by less than an allowable positional shift.

11. The fingerprint identification method according to claim 10, wherein, in the determining step, the method determines whether or not identity is established between the prerecorded fingerprint templates and the collation fingerprint information based only on the number of prerecorded fingerprint templates for which the corrected coordinates differ by less than the allowable positional shift.

12. The fingerprint identification method according to claim 10, wherein at least two prerecorded fingerprint templates that are distant from one another are excluded from the calculation of the number of prerecorded fingerprint templates for which the corrected coordinates differ by less than the allowable positional shift.

13. The fingerprint identification method according to claim 10, wherein at least two nonadjacent prerecorded fingerprint templates are excluded from the calculation of the number of prerecorded fingerprint templates for which the corrected coordinates differ by less than the allowable positional shift.

14. The fingerprint identification method according to claim 10, wherein, in the extracting step, the method extracts a predetermined number of collation positions which have high degrees of matching.

15. The fingerprint identification method according to claim 10, wherein, in the extracting step, the method extracts, based on a predetermined threshold value, the collation positions which have the highest degree of matching.

16. The fingerprint identification method according to claim 10, wherein the templates are images.

17. The fingerprint identification method according to claim 10, wherein the templates are images stored in one dimension.

18. The fingerprint identification method according to claim 17, wherein templates are obtained by dividing images of recorded fingerprints.

19. A computer-readable recording medium containing a program for controlling a computer to execute the steps of:
    collating positions in prerecorded fingerprint templates with positions in collation fingerprint information, wherein the collation fingerprint information is input for comparison with the templates;
    calculating the degree of matching between data in the templates and data in the collation fingerprint information;
    extracting collation positions based on the calculated degree of matching at each position with the collation fingerprint information, the collation positions indicating the position of the prerecorded fingerprint templates relative to the collation fingerprint information;
    calculating address differences between the prerecorded fingerprint templates and a reference template;
    generating corrected coordinates by adding the address differences to the collation positions; and
    determining whether or not identity is established between one or more of the prerecorded fingerprint templates and the collation fingerprint information by calculating the number of prerecorded fingerprint templates for which the corrected coordinates differ by less than an allowable positional shift.

20. A computer readable program product, adapted to be executed by said computer for executing the steps of:
    collating positions in prerecorded fingerprint templates with positions in collation fingerprint information, wherein the collation fingerprint information is input for comparison with the templates;
    calculating the degree of matching between data in the templates and data in the collation fingerprint information;
    extracting collation positions based on the calculated degree of matching at each position within the collation fingerprint information, the collation positions indicating the position of the prerecorded fingerprint templates relative to the collation fingerprint information;
    address distance calculating means for calculating address differences between the prerecorded fingerprint templates and a reference template;
    generation means for generating corrected coordinates by adding the address differences to the collation positions; and
    determining whether or not identity is established between one or more of the prerecorded fingerprint templates and the collation fingerprint information by calculating the number of prerecorded fingerprint templates for which the corrected coordinates differ by less than an allowable positional shift.

* * * * *